US012064770B2

(12) United States Patent
Iida (10) Patent No.: US 12,064,770 B2
(45) Date of Patent: Aug. 20, 2024

(54) REAGENT STORAGE AND AUTOMATIC ANALYZING APPARATUS

(71) Applicant: Canon Medical Systems Corporation, Otawara (JP)

(72) Inventor: Shin Iida, Tokyo (JP)

(73) Assignee: Canon Medical Systems Corporation, Otawara (JP)

( * ) Notice: Subject to any disclaimer, the term of this patent is extended or adjusted under 35 U.S.C. 154(b) by 106 days.

(21) Appl. No.: 17/487,417

(22) Filed: Sep. 28, 2021

(65) Prior Publication Data

US 2022/0097070 A1    Mar. 31, 2022

(30) Foreign Application Priority Data

Sep. 29, 2020 (JP) ................................. 2020-163827

(51) Int. Cl.
| | |
|---|---|
| *B01L 3/00* | (2006.01) |
| *B01L 7/00* | (2006.01) |
| *B01L 9/02* | (2006.01) |
| *G01N 35/00* | (2006.01) |
| *G01N 35/10* | (2006.01) |

(52) U.S. Cl.
CPC ................. *B01L 3/527* (2013.01); *B01L 7/00* (2013.01); *B01L 9/02* (2013.01); *G01N 35/1009* (2013.01); *B01L 2200/16* (2013.01); *B01L 2300/046* (2013.01); *B01L 2300/0832* (2013.01); *B01L 2300/1894* (2013.01); *B01L 2400/0406* (2013.01); *G01N 2035/00435* (2013.01)

(58) Field of Classification Search
CPC .... B01L 3/527; B01L 7/00; B01L 9/02; B01L 2200/16; B01L 2300/046; B01L 2300/0832; B01L 2300/1894; B01L 2400/0406; G01N 35/1009; G01N 2035/00435
See application file for complete search history.

(56) References Cited

U.S. PATENT DOCUMENTS

| | | | |
|---|---|---|---|
| 2010/0248346 A1* | 9/2010 | Kaneko ..................... | B01L 7/02 422/68.1 |
| 2012/0237398 A1* | 9/2012 | Katsumi ................ | G01N 35/04 422/68.1 |

FOREIGN PATENT DOCUMENTS

| | | |
|---|---|---|
| JP | 5-280851 A | 10/1993 |
| JP | 2010-237021 | 10/2010 |
| JP | 2012-112730 | 6/2012 |
| JP | 2019-200161 A | 11/2019 |

OTHER PUBLICATIONS

Office Action issued Jan. 23, 2024 in Japanese Patent Application No. 2020-163827.

* cited by examiner

*Primary Examiner* — Jill A Warden
*Assistant Examiner* — Alex Ramirez
(74) *Attorney, Agent, or Firm* — Oblon, McClelland, Maier & Neustadt, L.L.P.

(57) ABSTRACT

According to one embodiment, a reagent storage include a placement table, a housing, a cover, and a fan. The placement table on which a plurality of reagent containers are placed. The housing configured to contain the placement table. The cover having a probe hole through which a probe is inserted and configured to cover an opening of the housing. The fan configured to send air in a first space defined by an inner bottom of the housing and the placement table into a second space defined by the cover and the placement table and to exhaust the air in the second space through the probe hole.

11 Claims, 10 Drawing Sheets

REAGENT STORAGE AND AUTOMATIC ANALYZING APPARATUS

CROSS-REFERENCE TO RELATED APPLICATIONS

This application is based upon, and claims the benefit of priority from, the Japanese Patent Application No. 2020-163827, filed Sep. 29, 2020, the entire contents of which are incorporated herein by reference.

FIELD

Embodiments described herein relate generally to a reagent storage and an automatic analyzing apparatus.

BACKGROUND

An automatic analyzing apparatus used for clinical laboratory tests is adopted to find a concentration and an activity value of a measurement target substance, a length of time required for a change of the substance, and the like, by mixing a living specimen (hereinafter referred to as a "sample") such as blood and urine with a reagent in predetermined amounts to cause a reaction and measuring the amount of transmitted light or scattered light under light irradiation upon this mixed liquid.

Reagents are contained in reagent containers, and kept cold in a reagent storage provided in an automatic analyzing apparatus. The reagent storage has a reagent storage cover, in which probe holes are provided for a probe to enter through. At a timing based on the measurement, the reagent cooled in the reagent storage is sucked from the reagent container and discharged into a reaction container by a sample dispensing probe.

Depending on where the automatic analyzing apparatus is mounted, the ambient temperature may be higher than the temperature of the interior reagent storage, as a result of which outside air flowing in through the probe holes may cause condensation inside the reagent storage. Some conventional automatic analyzing apparatuses adopt a structure in which a mechanism for opening and closing the probe holes is provided in the reagent storage cover or a structure in which an air conditioner is provided to increase the internal pressure of the reagent storage.

Provision of such structures in an automatic analyzing apparatus, however, tends to cause problems, increasing manufacturing costs, lowering an ease of maintenance, and complicating the configuration of the automatic analyzing apparatus.

BRIEF DESCRIPTION OF THE DRAWINGS

FIG. 5 is a cross-sectional view of the reagent storage taken along line B2-B2 of the reagent storage in FIGS. 3 and 4, when viewed from a direction perpendicular to the cross section.

DETAILED DESCRIPTION

In general, according to one embodiment, a reagent storage includes a placement table, a housing, a cover, and a fan. The placement table on which a plurality of reagent containers are placed. The housing configured to contain the placement table. The cover having a probe hole through which a probe is inserted and configured to cover a top opening of the housing. The fan configured to send air in a first space defined by an inner bottom of the housing and the placement table into a second space defined by the cover and the placement table and to exhaust the air in the second space through the probe hole.

The automatic analyzing apparatus according to the present embodiment will be described in detail below with reference to the drawings.

Figure 1:
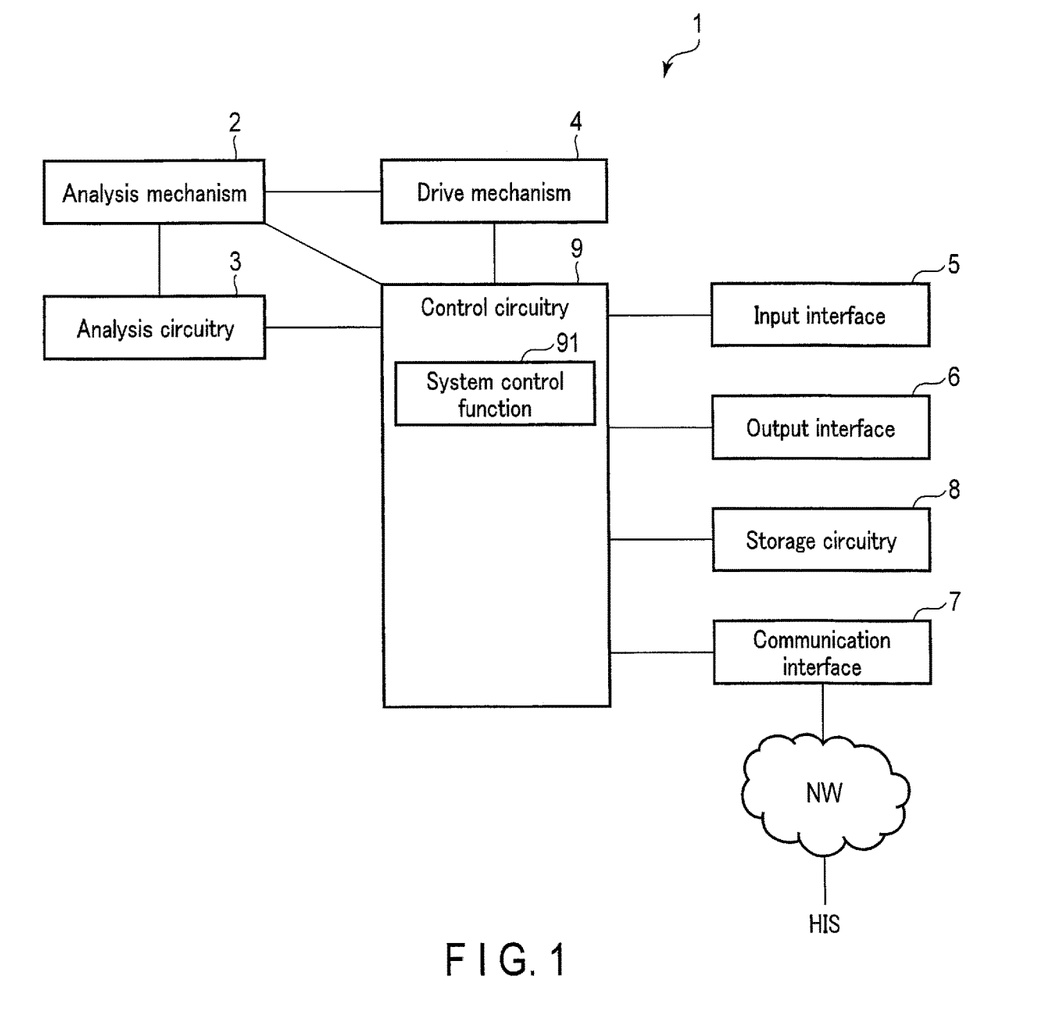
FIG. 1 is a block diagram for showing an exemplary configuration of an automatic analyzing apparatus according to an embodiment.

FIG. 1 is a block diagram for showing an exemplary configuration of an automatic analyzing apparatus according to an embodiment. As illustrated in FIG. 1, an automatic analyzing apparatus 1 according to the present embodiment includes an analysis mechanism 2, analysis circuitry 3, a drive mechanism 4, an input interface 5, an output interface 6, a communication interface 7, storage circuitry 8, and control circuitry 9.

The analysis mechanism 2 mixes a sample such as a standard sample or an examination target sample, and a reagent for an examination item determined for this sample. The analysis mechanism 2 performs measurements upon the mixed liquid of the sample and reagent, and generates standard data and examination target data, which may be expressed, for example, in absorbance or scattered light intensity.

The analysis circuitry 3 is a processor configured to analyze the standard data and examination target data generated by the analysis mechanism 2 and thereby generate calibration data, analysis data and the like. The analysis circuitry 3 reads an operation program from the storage circuitry 8, and generates calibration data, analysis data and the like according to the read-out operation program. For instance, the analysis circuitry 3 generates calibration data indicating the relationship between the standard data and a standard value predetermined for the standard sample, based on the standard data. The analysis circuitry 3 further generates analysis data expressed in a concentration value, enzyme activity value, and time required for a change, based on the examination target data and calibration data of the examination item corresponding to this examination target data. The analysis circuitry 3 outputs the generated calibration data, analysis data and the like to the control circuitry 9.

Under the control of the control circuitry 9, the drive mechanism 4 drives the analysis mechanism 2. The drive mechanism 4 may be realized by a gear, a stepping motor, a conveyor belt, a lead screw and the like.

The input interface 5 may receive setting of analysis parameters and the like for respective examination items relating to a measurement requested sample from a manipulator or through an intra-hospital network NW. The input interface 5 may be realized by a mouse, a' keyboard, a touch pad or the like on which a command is input when the operation screen is touched. The input interface 5 is coupled to the control circuitry 9 so that an operation command input by the manipulator can be converted to an electrical signal, which can be output to the control circuitry 9. Throughout the specification, the input interface 5 is not limited to an interface that includes a physical operational component such as a mouse and a keyboard. Examples of the input interface 5 may include electrical signal processing circuitry configured to receive an electrical signal corresponding to an operation command that has been input on an external input device provided separately from the automatic analyzing apparatus 1 and output this electrical signal to the control circuitry 9.

The output interface 6 is coupled to the control circuitry 9 to output a signal supplied from the control circuitry 9. The output interface 6 may be realized by display circuitry, print circuitry, an audio device and the like. Examples of the display circuitry may include a CRT display, a liquid crystal display, an organic EL display, an LED display, and a plasma display. The processing circuitry configured to convert data describing a display target to a video signal and externally output the video signal is also included in the display circuitry. The print circuitry may include a printer. The output circuitry configured to externally output the data describing a print target is also included in the print circuitry. The audio device may include a loudspeaker. The output circuitry configured to externally output an audio signal is also included in the audio device.

The communication interface 7 is coupled to the intra-hospital network NW. The communication interface 7 performs data communication with a hospital information system (HIS) through the intra-hospital network NW. The communication interface 7 may perform data communication with the HIS through a laboratory information system (LIS) connected to the intra-hospital network NW.

The storage circuitry 8 may include a magnetic or optical storage medium, or a processor readable storage medium such as a semiconductor memory. The storage circuitry 8 does not need to be realized by a single storage medium, and may be realized by a plurality of storage devices.

The storage circuitry 8 stores an operation program implemented by the analysis circuitry 3 and an operation program configured to realize the functions of the control circuitry 9. The storage circuitry 8 stores calibration data generated by the analysis circuitry 3 for each examination item. The storage circuitry 8 stores analysis data generated by the analysis circuitry 3 for each examination target sample. The storage circuitry 8 stores an examination order entered by a manipulator or an examination order received by the communication interface 7 through the intra-hospital network NW.

The control circuitry 9 is a processor serving as the center of the automatic analyzing apparatus 1. The control circuitry 9 implements the operation program stored in the storage circuitry 8 to realize the functions corresponding to the operation program. For instance, the control circuitry 9 implements the operation program to realize a system control function 91. According to the present embodiment, a single processor realizes the system control function 91, which is not a limitation. Multiple independent processors may be combined to form control circuitry, and each of the processors may implement the operation program to realize the system control function 91.

The system control function 91 is configured to perform centralized control upon the units of the automatic analyzing apparatus 1 based on the input information entered from the input interface 5.

Figure 2:
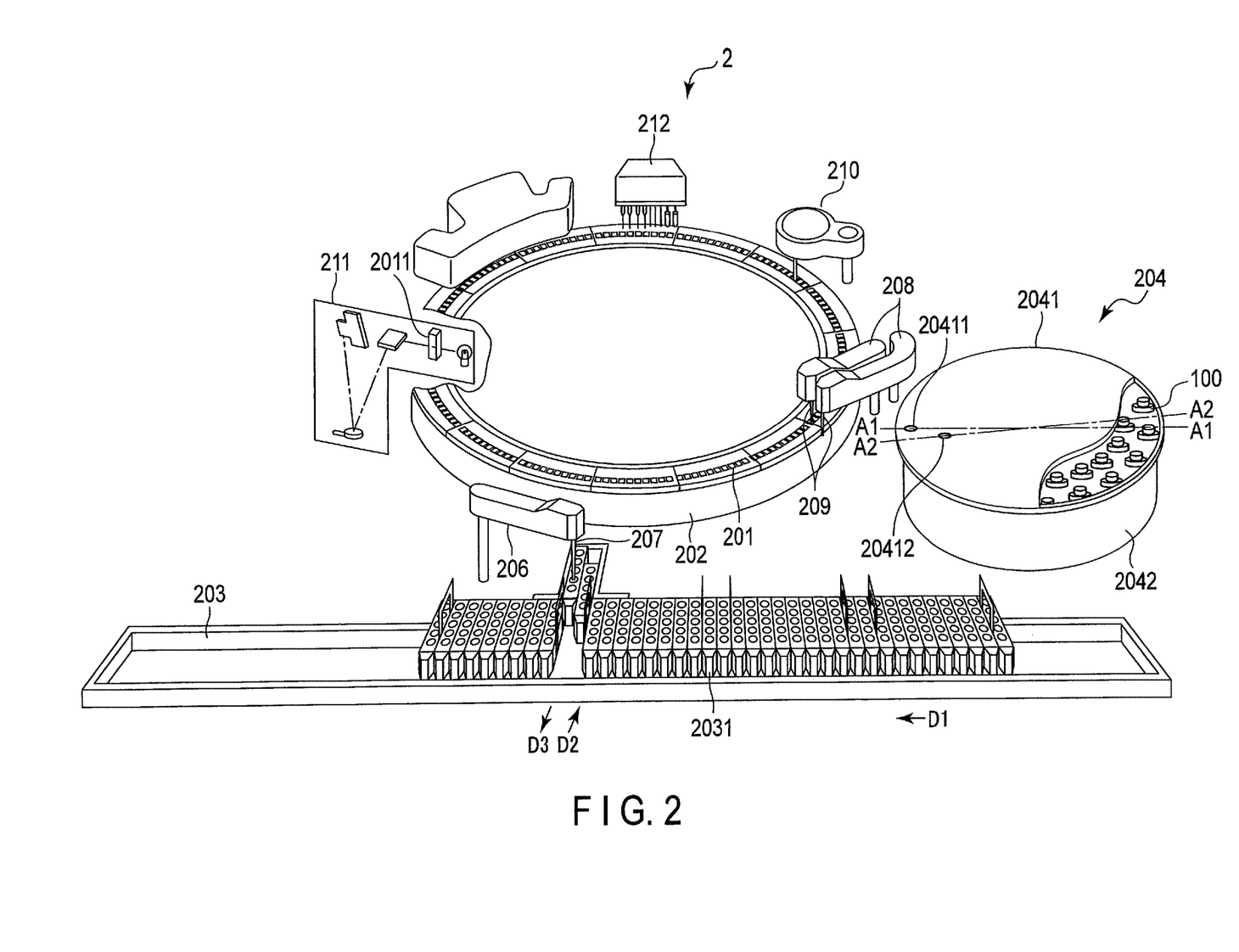
FIG. 2 is a diagram for showing an exemplary configuration of an analysis mechanism in FIG. 1.

FIG. 2 is a diagram for showing an exemplary configuration of an analysis mechanism in FIG. 1. For instance, as illustrated in FIG. 2, the analysis mechanism 2 may include a reaction disk 201, a temperature-controlled unit 202, a rack sampler 203, and a reagent storage 204.

The reaction disk 201 carries reaction containers 2011 along a predetermined route. To be more specific, the reaction disk 201 holds a plurality of reaction containers 2011 that are circularly arranged. With the drive mechanism 4, the reaction disk 201 alternately repeats rotating and stopping in predetermined time intervals. The reaction containers 2011 may be formed of glass.

The temperature-controlled unit 202 contains a heating medium set to a specific temperature, and soaks the reaction container 2011 in this heating medium to raise the temperature of the mixed liquid contained in the reaction container 2011.

The rack sampler 203 supports sample racks 2031 in a movable manner, where the sample racks 2031 can hold a plurality of sample containers containing the measurement requested samples. In the example of FIG. 2, sample racks 2031 each supporting five sample containers in a row are illustrated.

In the rack sampler 203, a transport area for carrying the sample racks 2031 is provided between the position where the sample racks 2031 are placed and the position where the sample racks 2031 that have been subjected to the measurement are collected. In the transport area, the sample racks 2031 aligned in a longitudinal direction are moved in direction D1 by the drive mechanism 4.

The rack sampler 203 is also provided with a capture area, in which the sample racks 2031 are captured from the transport area in order to move the sample containers held in the sample racks 2031 to a sample suction position. The sample suction position may be determined at the intersection of the swing path of the sample dispensing probe 207 and the movement path of the openings of sample containers that are held by the sample rack 2031 supported by the rack sampler 203. In the capture area, the sample rack 2031 that has been carried is moved in direction D2 by the drive mechanism 4.

The rack sampler 203 is further provided with a return area, in which the sample rack 2031 holding the sample containers from which the sample has been sucked is returned to the transport area. In the return area, the sample rack 2031 is moved in direction D3 by the drive mechanism 4.

The reagent storage 204 refrigerates a plurality of reagent containers 100 containing a reagent to be reacted with a certain component contained in a standard sample and an examination target sample. A rotating table is provided in a rotatable manner inside the reagent storage 204. The rotating table holds a removable reagent rack. The reagent rack holds a plurality of reagent containers 100 that are circularly arranged. The reagent storage 204 is covered by a removable reagent storage cover 2041. A reagent container 100 may be a pillar-like glass container. In particular, the reagent container 100 may be a cylindrical glass container, or may be a polygonal columnar glass container that can fit in a predetermined circular cylinder.

The analysis mechanism 2 illustrated in FIG. 2 includes a sample dispensing arm 206, a sample dispensing probe 207, a reagent dispensing arm 208, a reagent dispensing probe 209, a stirring unit 210, a photometric unit 211, and a cleaning unit 212.

The sample dispensing arm 206 is arranged between the reaction disk 201 and the rack sampler 203. The sample dispensing arm 206 is movable in the vertical direction and swingable in the horizontal direction by the drive mechanism 4. The sample dispensing arm 206 includes at one end thereof the sample dispensing probe 207.

In accordance with the swinging of the sample dispensing arm 206, the sample dispensing probe 207 swings along the arcuate swing path. A sample container held by the sample rack 2031 on the rack sampler 203 is positioned such that its opening falls on this swing path. A sample discharge position at which the sample sucked by the sample dispensing probe 207 is discharged into a reaction container 2011 is determined on the swing path of the sample dispensing probe 207. The sample discharge position corresponds, for example, to the intersection of the swing path of the sample dispensing probe 207 and the movement path of the reaction containers 2011 held by the reaction disk 201.

The sample dispensing probe 207 is driven by the drive mechanism 4 to move in a vertical direction immediately above the opening of a sample container held by the sample rack 2031 on the rack sampler 203, or at the sample discharge position. Under the control of the control circuitry 9, the sample dispensing probe 207 sucks the sample from the sample container positioned immediately below. Under the control of the control circuitry 9, the sample dispensing probe 207 also discharges the sucked sample to the reaction container 2011 positioned immediately below the sample discharge position.

The reagent dispensing arm 208 is arranged between the reaction disk 201 and the reagent storage 204. The reagent dispensing arm 208 is movable in the vertical direction and swingable in the horizontal direction by the drive mechanism 4. The reagent dispensing arm 208 includes at one end thereof the reagent dispensing probe 209.

In accordance with the swinging of the reagent dispensing arm 208, the reagent dispensing probe 209 swings along the arcuate swing path. A reagent suction position is determined on this swing path. The reagent suction position may be positioned at the intersection of the swing path of the reagent dispensing probe 209 and the movement path of the openings of the reagent containers 100 placed circularly on the rotating table. A reagent discharge position at which the reagent sucked by the reagent dispensing probe 209 is discharged into a reaction container 2011 is determined on the swing path of the reagent dispensing probe 209. The reagent discharge position corresponds, for example, to the intersection of the swing path of the reagent dispensing probe 209 and the movement path of the reaction containers 2011 held by the reaction disk 201.

The reagent dispensing probe 209 is driven by the drive mechanism 4 to move in a vertical direction at the reagent suction position or reagent discharge position on the swing path. Under the control of the control circuitry 9, the reagent dispensing probe 209 sucks the reagent from a reagent container stopped at the reagent suction position. That is, the reagent dispensing probe 209 is an example of a suction unit. Under the control of the control circuitry 9, the reagent dispensing probe 209 discharges the sucked reagent to the reaction container 2011 positioned immediately below the reagent discharge position.

The stirring unit 210 is provided near the outer periphery of the reaction disk 201. The stirring unit 210 includes a stirring bar, with which the sample and reagent contained in a reaction container 2011 at the stirring position on the reaction disk 201 are stirred.

The photometric unit 211 optically measures certain components of the mixed liquid of the sample and reagent discharged into the reaction container 2011. The photometric unit 211 includes a light source and a photodetector. Under the control of the control circuitry 9, the photometric unit 211 emits light from the light source. The emitted light is incident from the first side wall of the reaction container 2011 and exits through the second side wall facing the first side wall. The photometric unit 211 detects with the photodetector the light exiting from the reaction container 2011.

In particular, the photodetector detects the light that has passed through the mixed liquid of the standard sample and reagent in the reaction container 2011, and generates standard data expressed in absorbance or the like based on the intensity of the detected light. The photodetector also detects the light that has passed through the mixed liquid of the examination target sample and reagent in the reaction container 2011, and generates examination target data expressed in absorbance or the like based on the intensity of the detected light. The photometric unit 211 outputs the generated standard data and examination target data to the analysis circuitry 3. The photodetector may be configured to detect light scattered in the mixed liquid of the reaction container 2011, and generate standard data and examination target data expressed in scattered light intensity.

The cleaning unit 212 cleans the inside of the reaction containers 2011 in which the measurement of the mixed liquid has been completed by the photometric unit 211.

The basic configuration of the automatic analyzing apparatus 1 according to the present embodiment has been explained. Next, the reagent storage 204 refrigerating the reagent containers 100 will be explained in detail with reference to FIGS. 3 to 6.

Figure 3:
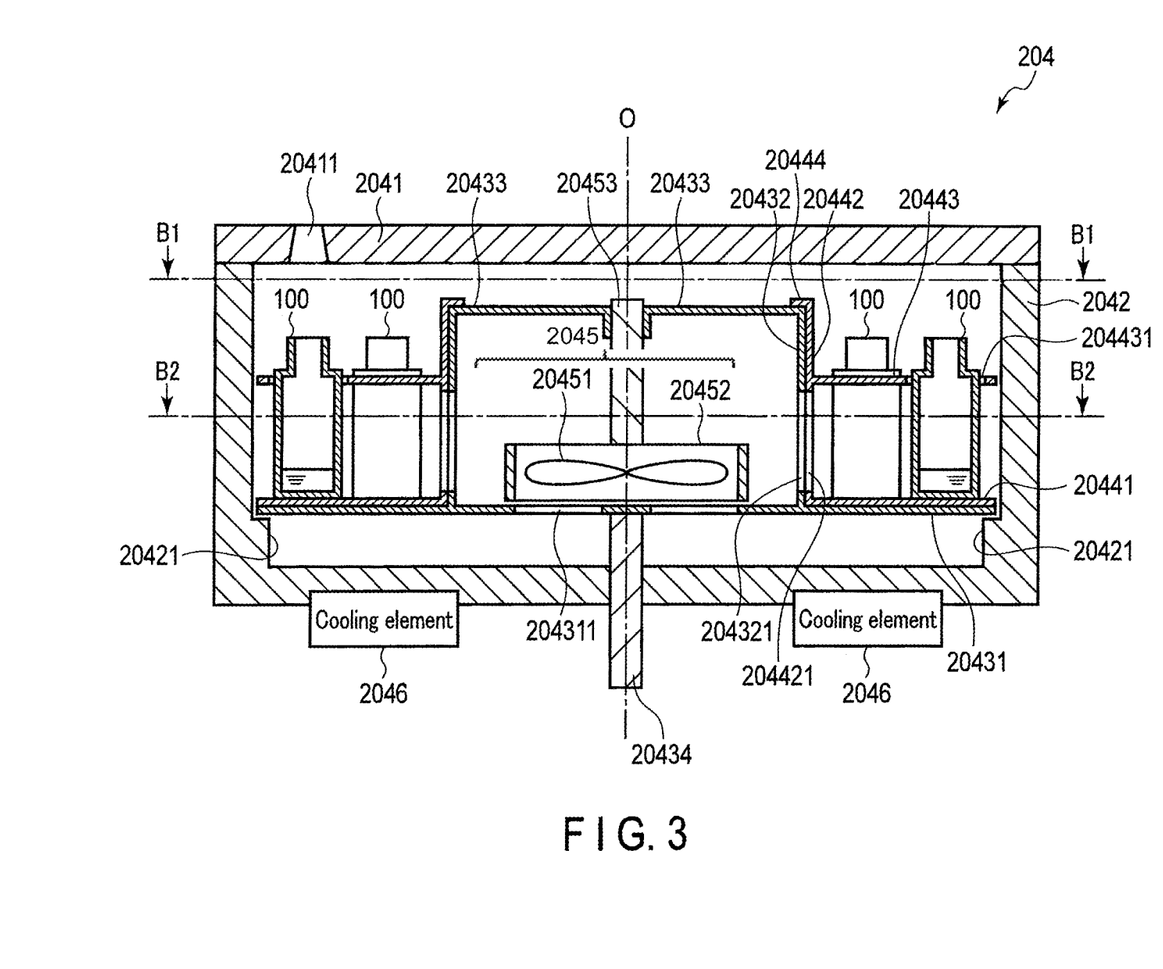
FIG. 3 is a cross-sectional view of a reagent storage taken along line A1-A1 of the reagent storage in FIG. 2, when viewed from a direction perpendicular to the cross section.
Figure 4:
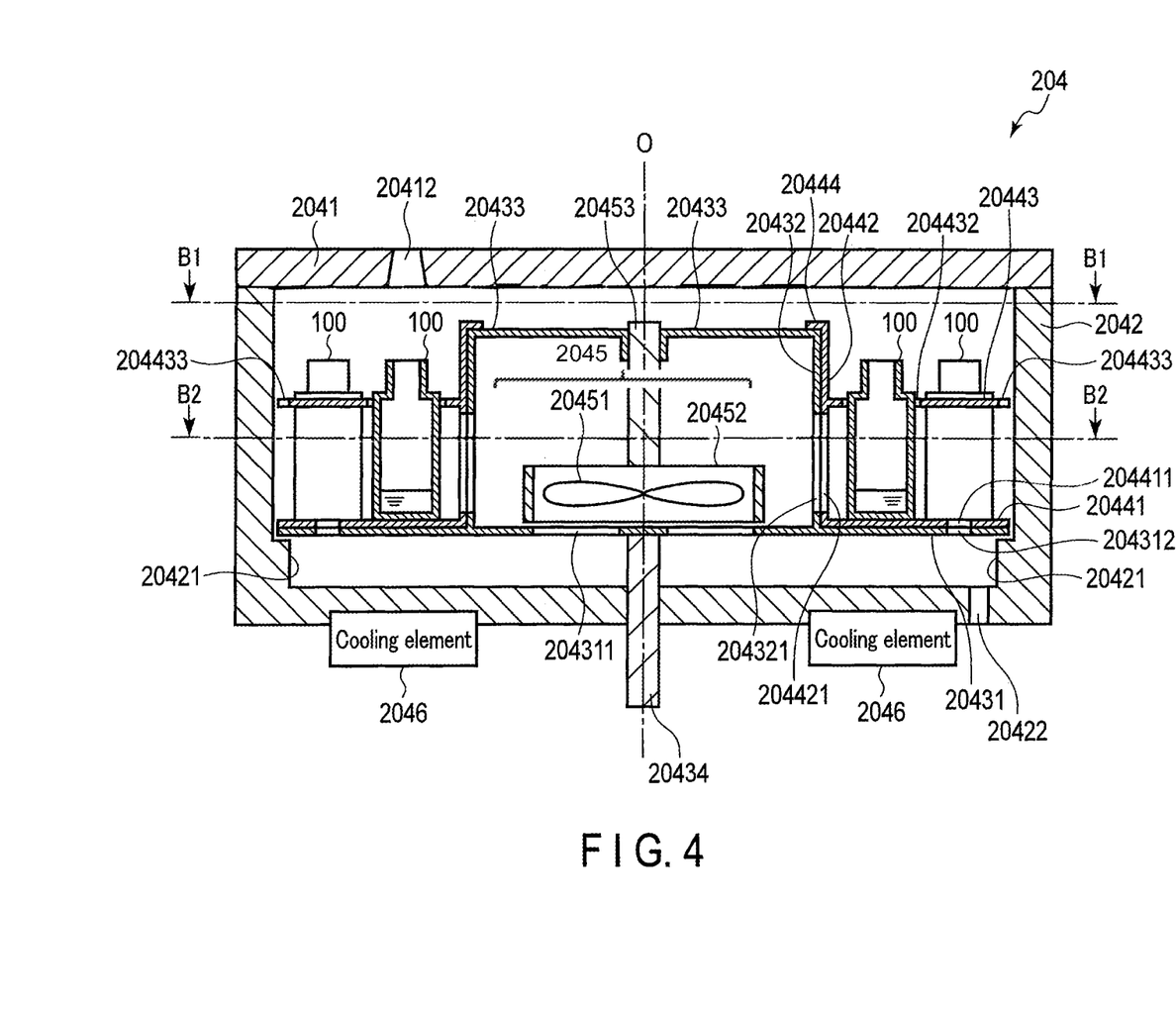
FIG. 4 is a cross-sectional view of the reagent storage taken along line A2-A2 of the reagent storage in FIG. 2, when viewed from a direction perpendicular to the cross section.
Figure 5:
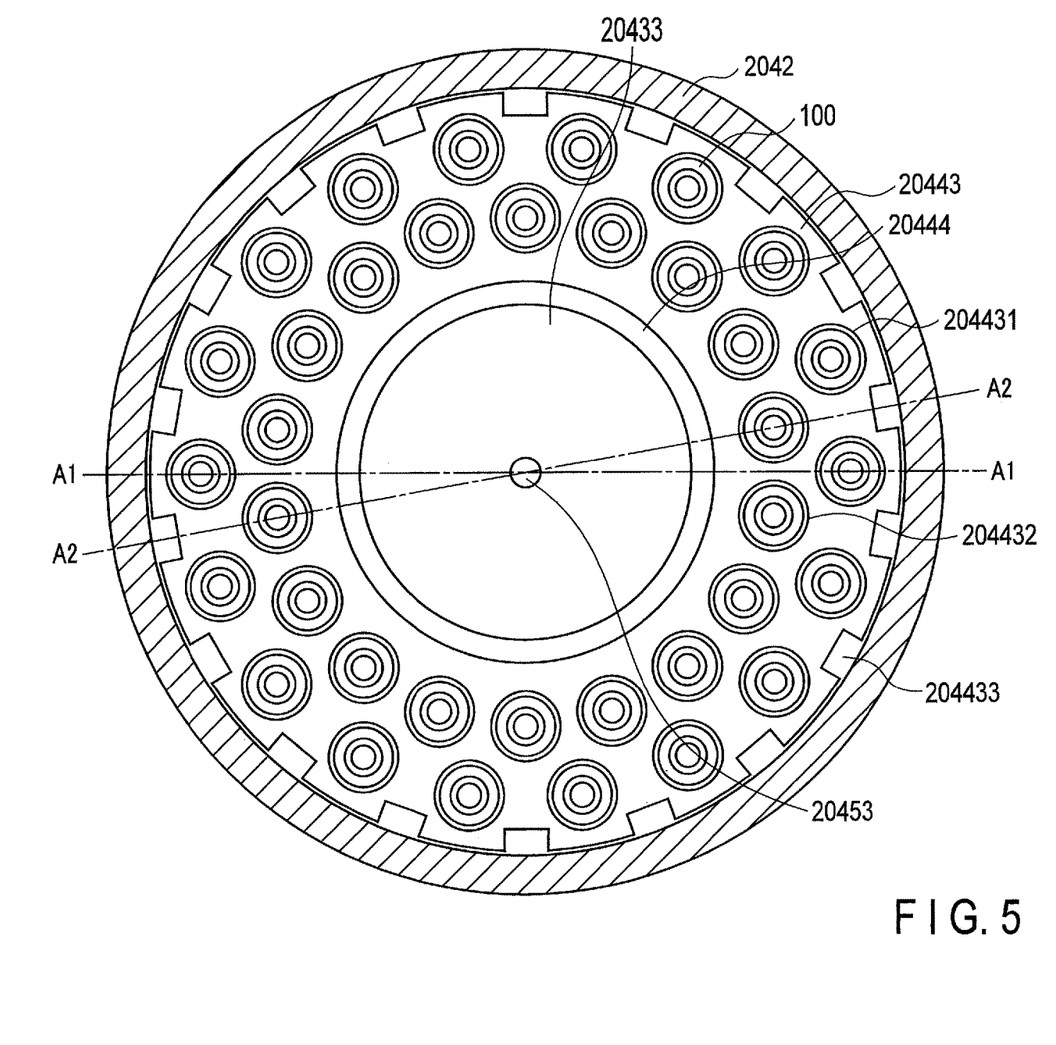
FIG. 5 is a cross-sectional view of the reagent storage taken along line B1-B1 of the reagent storage in FIGS. 3 and 4, when viewed from a direction perpendicular to the cross section.
Figure 6:
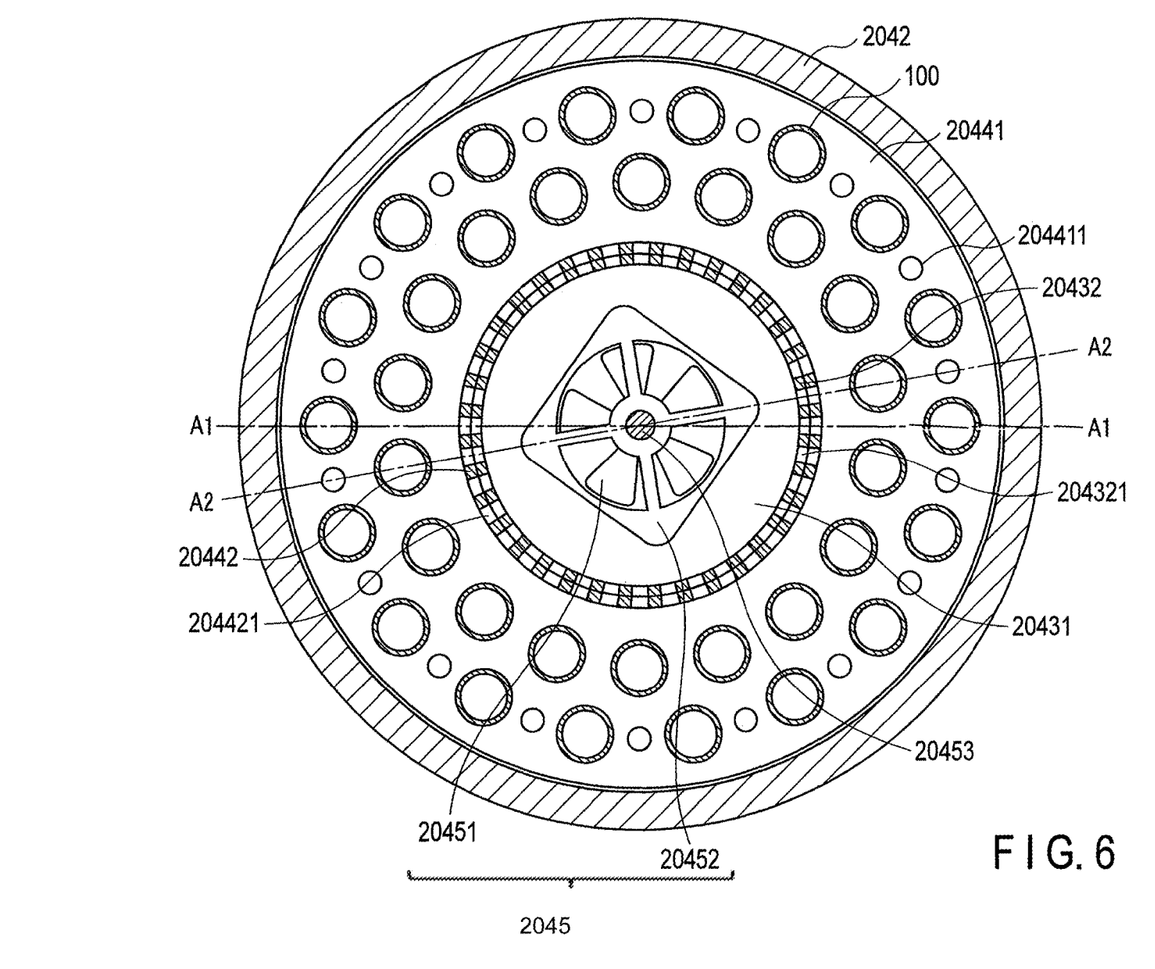

FIG. 3 is a cross-sectional view of the reagent storage taken along line A1-A1 of the reagent storage in FIG. 2, when viewed from a direction perpendicular to the cross section. FIG. 4 is a cross-sectional view of the reagent storage taken along line A2-A2 of the reagent storage in FIG. 2, when viewed from a direction perpendicular to the cross section. FIG. 5 is a cross-sectional view of the reagent storage taken along line B1-B1 of the reagent storage in FIGS. 3 and 4, when viewed from a direction perpendicular to the cross section. FIG. 6 is a cross-sectional view of the reagent storage taken along line B2-B2 of the reagent storage in FIGS. 3 and 4, when viewed from a direction perpendicular to the cross section.

The reagent storage 204 illustrated in FIGS. 3 to 6 includes a reagent storage cover 2041, a housing 2042, a table rotating mechanism 2043, a reagent rack 2044, a fan 2045, and a cooling element 2046. The table rotating mechanism 2043 includes a rotating table 20431, a first support unit 20432, and a first convection separating plate 20433. The reagent rack 2044 includes a reagent placement unit 20441, a second support unit 20442, a second convection separating plate 20443, and a fixation unit 20444. The fan 2045 includes a propeller 20451 and a frame 20452.

The reagent storage cover 2041 covers the top opening of the housing 2042. The reagent storage cover 2041 is provided with a first reagent suction opening 20411 and a second reagent suction opening 20412, through which the reagent dispensing probe 209 can be entered. The first reagent suction opening 20411 and second reagent suction opening 20412 are holes that penetrate the reagent storage cover 2041. The diameter of each hole may increase from the top surface to the back surface of the reagent storage cover 2041. In other words, these holes may be reverse-tapered. The first reagent suction opening 20411 and second reagent suction opening 20412 are positioned at the intersection of the swing path of the reagent dispensing probe 209 and the movement path of the openings of the reagent containers 100. The reagent suction opening may also be referred to as a probe hole.

The housing 2042 has a top opening at the upper end, and is formed in a manner such as to contain the table rotating mechanism 2043, reagent rack 2044, and fan 2045. The top opening of the housing 2042 is covered by the reagent storage cover 2041. The interior surface of the housing 2042 may be formed of a material having an excellent thermal conductivity such as aluminum. The housing 2042 further includes a thermal insulation portion formed of a thermal insulator to cover the interior surface.

A projection 20421 is formed along the periphery of the inner bottom of the housing 2042. The height of the projection 20421 is determined with reference to the height from the inner bottom to the rotating table 20431. The projection 20421 may be determined to have such a height that the rotating table 20431 barely touches the projection 20421. The width of the projection 20421 corresponds to the length extending from the side surface of the housing 2042, and can be freely determined in accordance with the temperature distribution of the reagent storage 204. With the projection 20421 provided in the housing 2042, the air flow between the rotating table 20431 and the side surface of the housing 2042 can be regulated.

A discharge hole 20422 is formed in the inner bottom of the housing 2042 to discharge the liquid from the housing 2042. In the inner bottom of the housing 2042, an inclination or an inclined groove may be provided in a manner such that the position of the discharge hole 20422 can be lowered. A plurality of discharge holes 20422 may be provided. The discharge hole 20422 communicates with outside air, and therefore when the fan 2045 is working, the hole serves as an intake air hole for drawing the outside air into the reagent storage 204. If the discharge hole 20422 does not communicate with outside air, an intake air hole may be separately provided in the inner bottom of the housing 2042 and the side surface of this inner bottom. An example of the housing 2042 having an intake air hole in the side surface of the inner bottom will be described later. Even in the configuration in which the discharge hole 20422 does communicate with outside air, an intake air hole may be provided in the inner bottom of the housing 2042 and the side surface of this inner bottom.

Under the control of the control circuitry 9, the table rotating mechanism 2043 carries reagent containers 100 to the first reagent suction opening 20411 or second reagent suction opening 20412. The table rotating mechanism 2043 is fixed to a rotation shaft 20434. In accordance with the rotation or stopping of the rotation shaft 20434, the table rotating mechanism 2043 also rotates or stops.

The rotating table 20431 is a table on which the reagent rack 2044 is placed. That is, the rotating table 20431 is an exemplary table for carrying a plurality of reagent containers 100 by way of the reagent rack 2044. The rotating table 20431 also serves to divide the reagent storage 204 into the first space, which is below the rotating table 20431, and the second space, which is above the rotating table 20431.

The rotating table 20431 is provided with a ventilation opening 204311 for ventilating from the first space to the second space as illustrated in FIGS. 3 and 4, and with a first ventilation hole 204312 for ventilating from the second space to the first space as illustrated in FIG. 4. The size of the ventilation opening 204311 is determined with reference to the opening of the fan 2045. In particular, the ventilation opening 204311 has a size approximately the same as the opening of the fan 2045. A plurality of first ventilation holes 204312 are provided in the rotating table 20431. The size and number of first ventilation holes 204312 may be freely determined in accordance with the temperature distribution inside the reagent storage 204. The ventilation opening 204311 may also be referred to as an opening portion.

The first support unit 20432 extends upward from the periphery of the rotating table 20431 having any circumference. This circumference may be determined to be large enough to fit the fan 2045 inside. The first support unit 20432 has a height large enough to fit the fan 2045 inside, and may be designed in accordance with the height of the reagent containers 100 placed in the reagent rack 2044.

The first support unit 20432 is provided with first passage holes 204321 in predetermined intervals in the circumferential direction. The positions of the first passage holes 204321 are based on the positions of the reagent containers 100 that are circularly arranged. In particular, the first passage holes 204321 are arranged on the line segments connecting the center of the reagent storage 204 and the centers of the respective reagent containers 100, as illustrated in FIG. 6. Preferably, a first passage hole 204321 is formed to have a shape elongated in the height direction of the reagent storage 204. The size of the first passage hole 204321 may be freely determined in accordance with the temperature distribution of the reagent storage 204.

The first convection separating plate 20433 is arranged in parallel to the rotating table 20431 in such a manner as to extend from the upper end of the first support unit 20432 toward the center of the housing 2042. The first convection separating plate 20433 is a component that separates the space defined by the reagent storage cover 2041 and rotating table 20431. The space defined by the reagent storage cover 2041 and rotating table 20431 is divided by the first convection separating plate 20433, for example into the space above the first convection separating plate 20433 and the space below the first convection separating plate 20433. The height of the space below the first convection separating plate 20433 is determined based on the height of a standard reagent container 100. For instance, the height of the space below the first convection separating plate 20433 is larger than the height of the reagent container 100 placed on the reagent rack 2044. With the first convection separating plate 20433, the cool air supplied by the fan 2045 will not be directly diffused into the space above the first convection separating plate 20433, and will temporarily stay in the space below the first convection separating plate 20433. With the cool air temporarily staying in the space below the first convection separating plate 20433, the cool air can be efficiently sent to the part of the reagent container 100 that requires refrigeration. The first convection separating plate 20433 has a hole around its center, through which a later-described fixation shaft 20453 is inserted.

The rotation shaft 20434 is fixed approximately at the center of the rotating table 20431. The rotation shaft 20434 is connected to a not-shown motor to transfer the power of the motor to the rotating table 20431. When the motor is driven under the control of the control circuitry 9, the table rotating mechanism 2043 entirely stops or rotates around the rotation shaft 20434 in accordance with the power of the motor transferred by the rotation shaft 20434.

The reagent rack 2044 is placed on the rotating table 20431. In particular, the reagent rack 2044 is mounted on the outer annular portion of the rotating table 20431 with respect to the first support unit 20432, which is also formed on the rotating table 20431. FIGS. 2 to 6 show an example of one reagent rack 2044 being placed on the rotating table 20431. The reagent rack 2044 may be separated into multiple pieces. If the reagent rack 2044 is separated into three pieces, each of the pieces will have a central angle of 120 degrees.

The reagent placement unit 20441 is a table on which the reagent containers 100 are placed. On this reagent placement unit 20441, the positions for placing the reagent containers 100 are predetermined. FIGS. 2 to 6 show the reagent containers 100 being placed in double rings. The placement of the reagent containers 100 is not limited to double rings, however, and may be in a single ring or in triple rings.

The positions of the reagent containers 100 are determined such that any two adjacent reagent containers 100 on the same circumference can maintain a preset distance between them. With the placement positions being regularly determined, the temperature distribution inside the reagent storage 204 will not become uneven.

The placement positions in the inner circumferential portion are determined such that the reagent containers 100 placed at these positions will face the interior wall of the housing 2042 through a gap between any adjacent two of the reagent containers 100 placed in the outer circumferential portion. With this configuration, the cool air flowing between the reagent containers 100 in the inner circumferential portion directly hits the reagent containers 100 in the outer circumferential portion.

The shape of a reagent container 100 directly placed on the reagent placement unit 20441 is predetermined. For instance, in FIG. 6, cylindrical reagent containers 100 are determined to be directly placed in the reagent placement unit 20441. The shape of a reagent container 100 directly placeable in the reagent placement unit 20441 is not limited to a cylinder, however, and may be a polygonal pillar.

Even if the shape of the reagent container 100 directly placeable in the reagent placement unit 20441 is predetermined, a placeable container is not limited to this shape. By attaching to a container an adapter corresponding to the shape of the placement of the reagent placement unit 20441, the adapter-attached containers may be placed in the reagent placement unit 20441. With such an adapter, containers of various shapes can be handled by attaching the adapter. The adapter may be incorporated not only for adapting the reagent container 100 to a suitable shape, but also for adapting the reagent container 100 to a suitable height.

As illustrated in FIGS. 4 and 6, the reagent placement unit 20441 is provided with second ventilation holes 204411 for ventilating from the second space above the rotating table 20431 to the first space below the rotating table 20431. The size of a second ventilation hole 204411 is determined with reference to the first ventilation hole 204312 formed in the rotating table 20431. The size of the second ventilation hole 204411 may be the same as the size of the first ventilation hole 204312. The number of second ventilation holes 204411 may be the same as the number of first ventilation holes 204312.

The second support unit 20442 extends upward from the inner periphery of the reagent placement unit 20441. The height of the second support unit 20442 is determined in accordance with the height of the first support unit 20432.

The second support unit 20442 is provided with second passage holes 204421 in predetermined intervals in the circumferential direction. The positions of the second passage holes 204421 are based on the positions of the reagent containers 100 that are circularly arranged. In particular, the second passage holes 204421 are provided on the line segments connecting the center of the reagent storage 204 and the centers of the respective reagent containers 100, as illustrated in FIG. 6. Preferably, a second passage hole 204421 is formed to have a shape elongated in the height direction of the reagent storage 204. In particular, the shape of each second passage hole 204421 is approximately the same as the shape of each first passage hole 204321. The shape of the second passage holes 204421, however, does not matter as long as they would not block the first passage holes 204321. For instance, the number of second passage holes 204421, which are illustrated in FIG. 6 as being the same in number as the first passage holes 204321, may be reduced as long as the second passage holes 204421 would not block the first passage holes 204321.

The second convection separating plate 20443 is arranged in parallel to the reagent placement unit 20441 in such a manner as to extend from any position of the second support unit 20442 toward the side surface of the housing 2042. The second convection separating plate 20443 is a component that separates the space defined by the reagent storage cover 2041 and the reagent placement unit 20441. The space defined by the reagent storage cover 2041 and the reagent placement unit 20441 is divided by the second convection separating plate 20443, for example into the space above the second convection separating plate 20443 and the space below the second convection separating plate 20443. The height of the space below the second convection separating plate 20443 is determined based on the height of a standard reagent container 100. For instance, the height of the space below the second convection separating plate 20443 is determined such that the main body of the reagent container 100 containing the reagent can be fit in. As a result, the portion of the reagent container 100 that requires refrigeration is positioned in the space below the second convection separating plate 20443.

The second convection separating plate 20443 is provided with a protrusion hole 204431 (see FIGS. 3 and 5) and a protrusion hole 204432 (see FIGS. 4 and 5) for the opening of the reagent container 100 placed in the reagent placement unit 20441 to protrude on the top surface of the reagent storage 204. For instance, the positions where the protrusion holes 204431 are formed correspond to the placement positions of the reagent containers 100 determined in the outer circumferential portion of the reagent placement unit 20441, and the positions where the protrusion holes 204432 are formed correspond to the placement positions of the reagent containers 100 determined in the inner circumferential portion of the reagent placement unit 20441, as illustrated in FIG. 5. The shape of a protrusion hole 204431 and protrusion hole 204432 corresponds to the shape of a reagent container 100 determined to be directly placeable for the reagent placement unit 20441.

When the reagent placement unit 20441 is determined to carry cylindrical reagent containers 100 in double rings, the second convection separating plate 20443 is provided with circular protrusion holes of a diameter slightly larger than that of a predesigned reagent container 100, in double rings.

If the reagent placement unit 20441 is designed, for example, to carry polygonal-pillar reagent containers 100 in a single ring, the second convection separating plate 20443 may be provided with polygonal protrusion holes slightly larger than a predesigned reagent container 100, in a single ring.

In the second convection separating plate 20443, grooves are formed to release the cool air to the space above the second convection separating plate 20443. For instance, multiple ventilation grooves 204433 are formed in the second convection separating plate 20443, as illustrated in FIGS. 4 and 5. The ventilation grooves 204433 are configured to form a gap between the second convection separating plate 20443 and the interior wall of the housing 2042. The ventilation grooves 204433 may be produced by cutting approximately rectangular portions out of the edge portion of the second convection separating plate 20443 in a direction toward the center of the housing 2042, at positions of the edge portion away in a radial direction from the protrusion holes 204432 of the second convection separating plate 20443. In this manner, a gap is created for air passage between the ventilation grooves 204433 and the interior wall of the housing 2042.

The shape of the ventilation grooves 204433 is not limited to a rectangle, and may be freely determined as long as the shape would not cause unevenness or disturbance in the air passage. The width and number of ventilation grooves 204433 can be freely determined in accordance with the temperature distribution inside the reagent storage 204. The positions of the ventilation grooves 204433 are not limited to the edge portion of the table away in the radial direction from the positions of the reagent containers 100 in the outer circumferential portion, and can be freely determined as long as the positions would not cause unevenness or disturbance in the air passage. In place of, or in addition to, the grooves, holes may be provided in the second convection separating plate 20443 for the above described purpose.

The fixation unit 20444 is provided in part of the second support unit 20442 to fix the reagent rack 2044 to the table rotating mechanism 2043. For instance, the fixation unit 20444 is engaged with a to-be-fixed portion (not shown) of the first convection separating plate 20433 so as to fix the reagent rack 2044 to the table rotating mechanism 2043.

The fan 2045 is an exemplary means that is driven under the control of the control circuitry 9 to send air in a predetermined direction. One surface of the fan 2045 is fixed to the fixation shaft 20453, while the other surface faces the rotating table 20431 and ventilation opening 204311. This other surface of the fan 2045 is arranged away from the rotating table 20431 in such a manner that they barely touch each other. The fan 2045 has an opening formed by the frame 20452. A propeller 20451 is arranged in the opening of the fan 2045. The fan 2045 turns the propeller 20451 so as to send the air of the first space below the rotating table 20431 into the second space above the rotating table 20431.

The propeller 20451 spins in the direction of sending the air of the first space below the rotating table 20431 into the second space above the rotating table 20431. The size and number of blades of the propeller 20451 and the rotational speed of the propeller 20451 can be freely determined in accordance with the temperature distribution inside the reagent storage 204.

The frame 20452 accommodates the propeller 20451 in its opening. The frame 20452 may also accommodate a motor for spinning the propeller 20451. The size of the opening may be freely determined in accordance with the size of the propeller 20451. FIG. 6 shows a rectangular frame 20452, but the outer shape is not limited thereto. The outer shape of the frame 20452 may be circular.

The lower end of the fixation shaft 20453 is fixed approximately to the center of the frame 20452, and the upper end thereof is fixed to part of the housing 2042 (not shown). The fixation shaft 20453 extends through a hole in the first convection separating plate 20433, which does not affect the rotation of the table rotating mechanism 2043. For instance, the fixation shaft 20453 is configured to not touch the hole in the first convection separating plate 20433, or to not be affected by the rotation of the table rotating mechanism 2043 with the bearing attached to the hole in the first convection separating plate 20433.

The cooling element 2046, which is an exemplary cooling means, is a semiconductor element driven under the control of the control circuitry 9 for generating cooling effects. Multiple cooling elements 2046 may be arranged at the bottom surface of the housing to keep cooled air below the reagent containers 100. In particular, the cooling elements 2046 are provided in the bottom of the housing 2042. By cooling the bottom with the cooling elements 2046, the first space below the rotating table 20431 is cooled.

Figure 7:
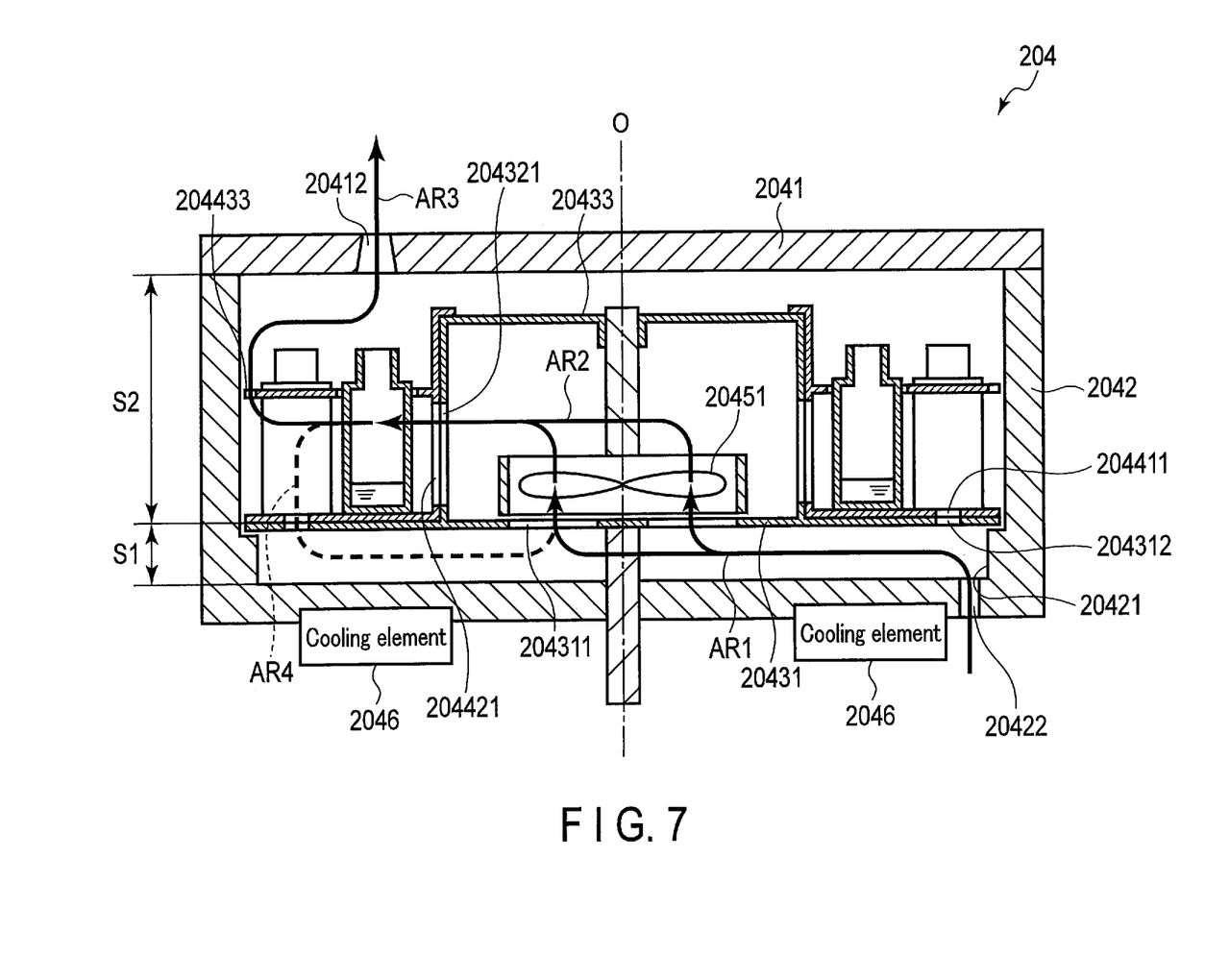
FIG. 7 is a diagram for showing an exemplary convection inside the reagent storage of FIG. 2.

Next, convection generated inside the reagent storage 204 having the above configuration will be explained with reference to FIG. 7, which is a diagram for showing an exemplary convection inside the reagent storage of FIG. 2. FIG. 7 shows the first space S1 below the rotating table 20431 and the second space S2 above the rotating table 20431.

First, the manipulator opens the reagent storage cover 2041, and places onto the rotating table 20431 the reagent rack 2044 having the reagent containers 100 set up. Preferably, the reagent rack 2044 carries reagent containers 100 fully at all the placement positions. After the reagent rack 2044 is placed in the reagent storage 204, the manipulator closes the reagent storage cover 2041.

When the reagent storage cover 2041 is closed, the propeller 20451 of the fan 2045 starts spinning at a certain timing (hereinafter, this will be described as "spinning of the fan 2045"). Spinning of the fan 2045 is not limited to when the reagent storage cover 2041 is closed, and the fan 2045 may be, for example, constantly spinning. If the temperature of the reagent storage 204 has been increased or is increasing due to the reagent storage cover 2041 being opened, the control circuitry 9 may perform control such that the power of the cooling element 2046 is boosted and the number of revolutions of the fan 2045 is increased.

During the spinning of the fan 2045, the air in the first space S1 is aspirated by the fan 2045, and the aspirated air is sent to the space surrounded by the first convection separating plate 20433 and the rotating table 20431. Since the air in the first space S1 is cooled by the cooling elements 2046, the air sent to the space surrounded by the first convection separating plate 20433 and the rotating table 20431 is cool air. As indicated by arrow AR1 in FIG. 7, outside air is taken in through the discharge hole 20422 in accordance with the exhaust of air from the first space S1 by the fan 2045. With the air forcibly exhausted and naturally aspirated by the fan 2045, the pressure in the first space S1 becomes negative.

As indicated by arrow AR2 in FIG. 7, the air sent to the space surrounded by the first convection separating plate 20433 and rotating table 20431 flows into the space surrounded by the second convection separating plate 20443 and reagent placement unit 20441, through the first passage holes 204321 and second passage holes 204421. The flowing-in cooled air cools the reagent containers 100, which are exposed in the space surrounded by the second convection separating plate 20443 and reagent placement unit 20441.

As indicated by arrow AR3 in FIG. 7, the air that has flowed into the space surrounded by the second convection separating plate 20443 and reagent placement unit 20441 flows through the ventilation grooves 204433 into the space facing the reagent storage cover 2041, and then flows through the second reagent suction opening 20412 to the outside of the reagent storage 204. In this manner, air is taken into the second space S2 by the fan 2045, in accordance with which the air in the second space S2 is exhausted through the second reagent suction opening 20412. With the air forcibly aspirated and naturally exhausted by the fan 2045, the pressure in the second space S2 becomes positive. Air may also be exhausted through the first reagent suction opening 20411, although it is not shown in FIG. 7.

The air that has flowed into the space surrounded by the second convection separating plate 20443 and reagent placement unit 20441 as indicated by arrow AR4 in FIG. 7 flows into the first space S1 through the second ventilation hole 204411 and first ventilation hole 204312. The air that has flowed into the first space S1 is cooled again by the cooling elements 2046, and thereafter is exhausted again to the second space S2 by the fan 2045.

Figure 8:
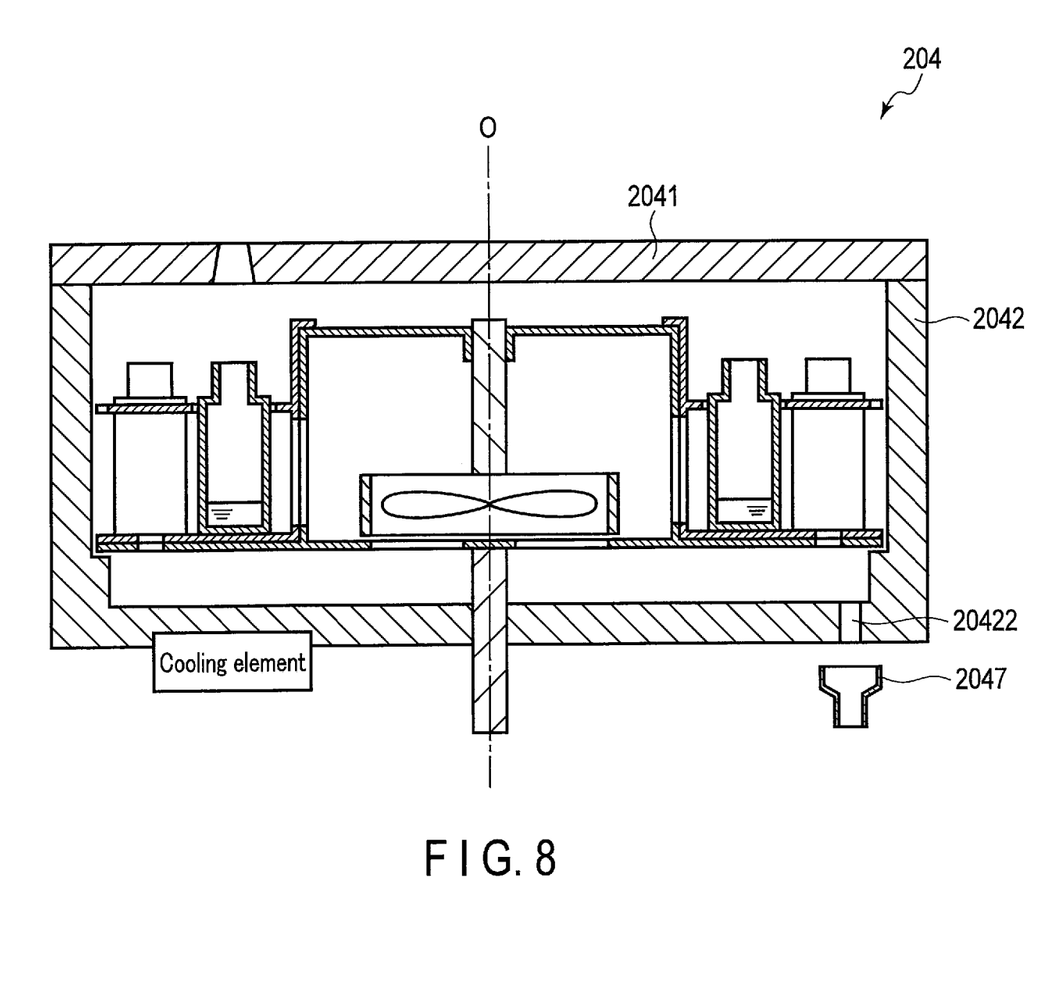
FIG. 8 is a cross-sectional view showing another exemplary configuration of the reagent storage according to the embodiment.

FIG. 8 is a cross-sectional view showing another exemplary configuration of the reagent storage according to the embodiment. The reagent storage 204 of FIG. 8 includes a tubular member 2047 immediately under the discharge hole 20422 in order to guide the liquid exhausted to the outside of the housing 2042 through the discharge hole 20422. The tubular member 2047 is distanced from the housing 2042. With a distance provided between the tubular member 2047 and the housing 2042, outside air can be caused to flow into the reagent storage 204 through a gap between the tubular member 2047 and the housing 2042. The distance between the tubular member 2047 and housing 2042 may be set as needed. If the tubular member 2047 is communicated with outside air, the tubular member 2047 may be connected directly to the housing 2042. If the tubular member 2047 is directly connected to the housing 2042, a bracket may be provided to the housing 2042 such that the tubular member 2047 may be attached to this bracket.

The upper end of the tubular member 2047 has a diameter larger than that of the discharge hole 20422. The lower end of the tubular member 2047 may have the same diameter as the upper end, or a smaller diameter than that of the upper end. The tubular member 2047 may be a funnel. A tube may be connected to the lower end of the tubular member 2047 in order to guide the liquid from the housing 2042 to a waste liquid bottle.

As described above, in the reagent storage 204 according to the present embodiment, the rotating table 20431 on which the reagent rack 2044 is placed separates the space of the reagent storage 204 into the first space and second space. The fan 2045 arranged close to the rotating table 20431 sends the air in the first space to the second space through the ventilation opening 204311 provided in the rotating table 20431. As a result, the approximately air-tight first space and second space demonstrate a negative pressure and a positive pressure, respectively.

With the pressure of the second space above the rotating table 20431 being positive, the inflow of the outside air through the first reagent suction opening 20411 and second reagent suction opening 20412 provided in the reagent storage cover 2041 can be regulated. With the inflow of the outside air through the first reagent suction opening 20411 and second reagent suction opening 20412 being regulated, condensation can be suppressed in the first reagent suction opening 20411 and second reagent suction opening 20412. In addition, the inflow of the outside air yet to be cooled directly into the second space can be reduced, and the cooling effects for the reagent containers 100 in the second space therefore can be improved.

With the pressure of the first space below the rotating table 20431 being negative, the outside air flows in through the discharge hole 20422 provided in the inner bottom of the housing 2042. The outside air that enters the first space is cooled by the cooling elements 2046 embedded in the bottom of the housing 2042. The outside air that is being cooled may cause condensation in the first space. On the other hand, the cooled outside air is sent to the second space, which suppresses condensation inside the second space.

The second space demonstrating a positive pressure has been described above, which is not a limitation. Specifically, the inflow of the outside air through the first reagent suction opening 20411 and second reagent suction opening 20412 needs to be regulated in the second space, and for this purpose, the pressure inside the second space needs to be sufficiently balanced with the pressure outside the reagent storage 204. In other words, a pressure of the second space should be maintained so as to not become negative.

According to the above embodiment, the intake air hole in the housing 2042 of the reagent storage 204 is also used as a discharge hole in the inner bottom of the housing 2042, which is not a limitation. An intake air hole may be provided in the inner bottom of the housing 2042 and the side surface of this inner bottom. An intake air hole provided in the side surface of the inner bottom of the housing 2042 will be explained below by referring to FIGS. 9 and 10.

Figure 9:
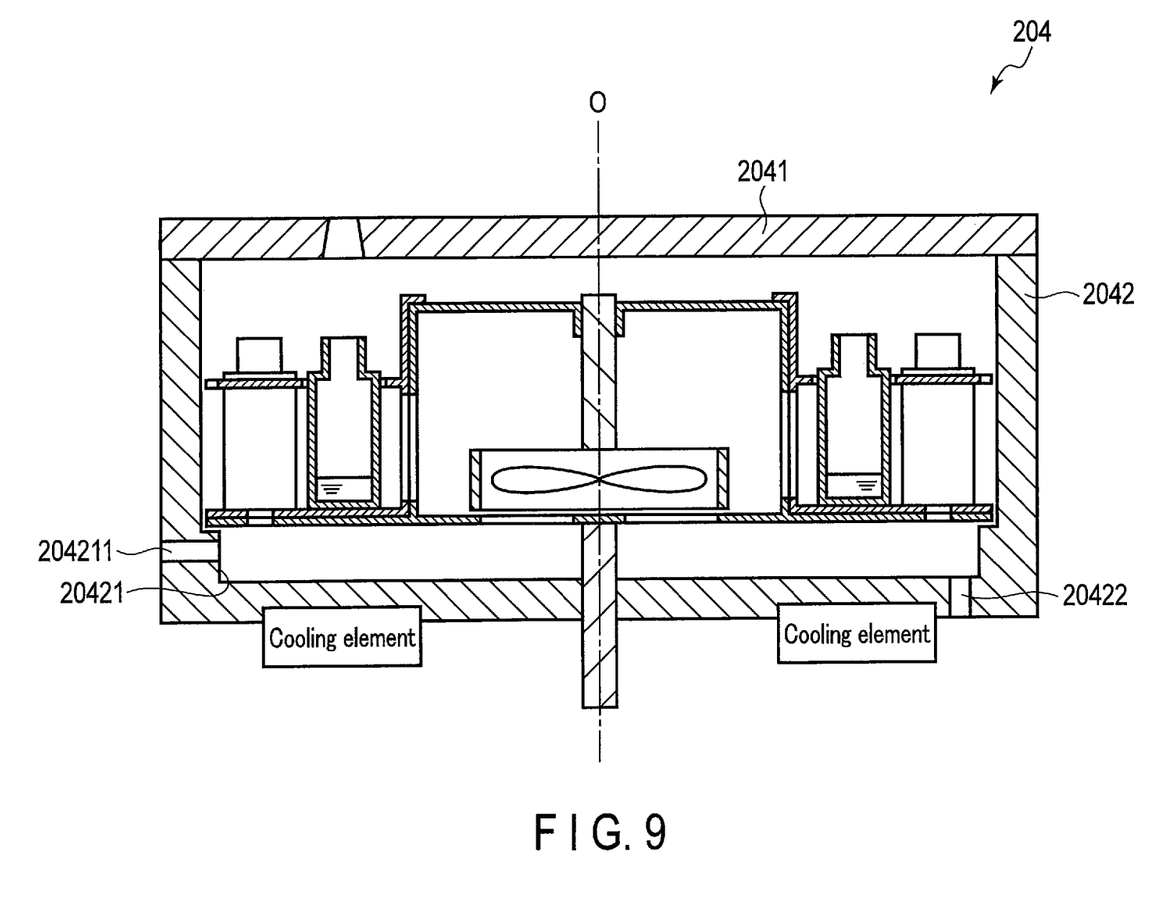
FIG. 9 is a cross-sectional view showing an exemplary configuration of an intake air hole provided in the reagent storage according to the embodiment.

FIG. 9 is a cross-sectional view showing an exemplary configuration of an intake air hole provided in the reagent storage according to the embodiment. An intake air hole 204211 is formed in the projection 20421, which is formed on the inner bottom of the housing 2042, as illustrated in FIG. 9. The intake air hole 204211 is communicated with the outside air, through which outside air is drawn into the reagent storage 204 when the fan 2045 is working. A plurality of intake air holes 204211 may be provided. If an intake air hole 204211 is provided in the housing 2042, the discharge hole 20422 may not need to serve as an intake air hole.

Figure 10:
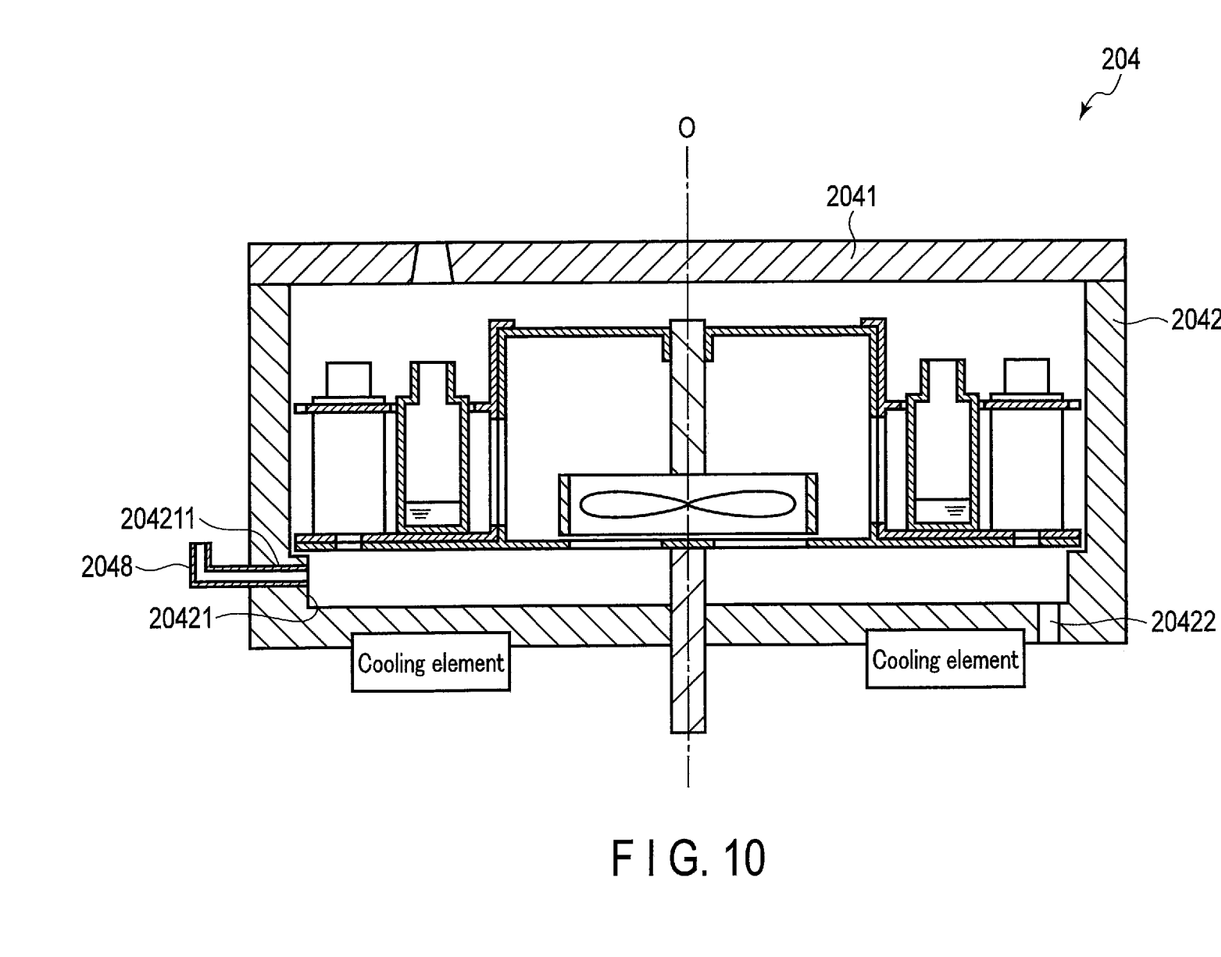
FIG. 10 is a cross-sectional view showing another exemplary configuration of the intake air hole provided in the reagent storage according to the embodiment.

FIG. 10 is a cross-sectional view showing another exemplary configuration of the intake air hole provided in the reagent storage according to the embodiment. As illustrated in FIG. 10, the intake air hole 204211 may include an L-shaped tubular member 2048. The L-shaped tubular member 2048 may have one linear portion connected to the intake air hole 204211 from the outside of the housing 2042. The other linear portion of the L-shaped tubular member 2048 has an opening that faces upward. With this configuration, the liquid produced by the condensation inside the L-shaped tubular member 2048 will not flow out, but will return to the housing 2042.

According to at least one embodiment explained above, the inflow of outside air through a probe hole into the reagent storage can be regulated with a simple configuration.

The term "processor" used in the embodiment may denote a central processing unit (CPU), a graphics processing unit (GPU), or any circuitry such as an application specific integrated circuit (ASIC), a programmable logic device (e.g., simple programmable logic device (SPLD), a complex programmable logic device (CPLD), and a field programmable gate array (FPGA)). The processor realizes functions by reading and executing a program stored in the memory circuitry. Instead of storing the program in the memory circuit, the program may be directly incorporated into the circuit of the processor. In this case, the processor realizes the functions by reading and executing the program incorporated in the circuit. The above processors according to the embodiments are not limited to a single circuit for each processor, but may be configured as a processor by combining different independent circuits to realize the functions. Furthermore, the structural components in the above embodiment may be integrated into one processor to realize their functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A reagent storage comprising:
 a housing including a first hole connecting an inside and an outside of the housing;
 a placement table provided in the housing on which a plurality of reagent containers are placed, the placement table dividing a space in the housing into a first space which is below the placement table and a second space which is above the placement table, the first hole being provided to face the first space;
 a cover having a probe second hole through which a probe is inserted and configured to cover a top opening of the housing;
 a fan arranged above the placement table and configured to send air upward thereat;
 a first convection separating plate arranged so as to surround the fan; and
 a second convection separating plate connected to the first convection separating plate and retaining the reagent containers, wherein
 the fan is configured to cause air outside of the housing to:
  through the first hole;
  pass through the first space and the second space;
  be brought into direct contact with the reagent containers, via a space defined by the first convection separating plate and the placement table and a space defined by the second convection separating plate and the placement table; and
  flow out of the housing through the second hole.

2. The reagent storage according to claim 1, wherein an inner bottom of the housing has a projection formed along a periphery of the housing, and
 the projection is configured to regulate air flow between the placement table and a side surface of the housing.

3. The reagent storage according to claim 1, wherein the placement table has an opening, and
 the fan is arranged to face the opening, and configured to send the air in the first space into the second space through the opening.

4. The reagent storage according to claim 1, wherein the placement table has a plurality of holes, and
 the fan is configured to send the air in the second space into the first space through the holes.

5. The reagent storage according to claim 1, further comprising:
 a cooling element configured to cool the first space.

6. The reagent storage according to claim 1, wherein an inner bottom of the housing has the first hole through which a liquid in the housing is discharged, and
 the fan is configured to aspirate outside air through the discharge first hole.

7. The reagent storage according to claim 1, further comprising:
 a cooling element configured to cool the first space, wherein
 an inner bottom of the housing has the first hole,
 the fan is configured to aspirate outside air through the first hole, and
 the cooling element is configured to cause condensation inside the first space by cooling the aspirated outside air.

8. The reagent storage according to claim 6, further comprising:
 a tubular member distanced from the housing, having a diameter larger than a diameter of the first hole, and configured to guide the liquid to an outside of the housing.

9. The reagent storage according to claim 2, further comprising:
 a cooling element configured to cool the first space, wherein
 the projection has the first hole,
 the fan is configured to aspirate outside air through the first hole, and
 the cooling element is configured to cause condensation inside the first space by cooling the aspirated outside air.

10. The reagent storage according to claim 9, further comprising:
 an L-shaped tubular member configured to aspirate the outside air through the first hole, wherein
 one linear portion of the L-shaped tubular member is connected to the first hole from an outside of the housing, and
 the other linear portion of the L-shaped tubular member is arranged such that an opening portion of the L-shaped tubular member faces upward.

11. An automatic analyzing apparatus comprising:
 a reagent storage configured to contain a plurality of reagent containers; and
 a reagent dispensing probe configured to aspirate a reagent contained in at least one of the reagent containers, wherein
 the reagent storage comprises:
  a housing including a first hole connecting an inside and an outside of the housing;
  a placement table provided in the housing on which the reagent containers are placed, the placement table dividing a space in the housing into a first space which is below the placement table and a second space which is above the placement table, the first hole being provided to face the first space;
  a cover having a probe second hole through which the reagent dispensing probe is inserted and configured to cover an opening of the housing;
  a fan arranged above the placement table and configured to send air upward thereat;
  a first convection separating plate arranged so as to surround the fan; and a second convection separating plate connected to the first convection separating plate and retaining the reagent containers, the fan is configured to cause air outside of the housing to:
  flow into the first space through the first hole;
  pass through the first space and the second space;
  be brought into direct contact with the reagent containers, via a space defined by the first convection separating plate and the placement table and a space defined by the second convection separating plate and the placement table; and
  flow out of the housing through the second hole.

* * * * *